(12) United States Patent
Chen et al.

(10) Patent No.: US 7,110,457 B1
(45) Date of Patent: Sep. 19, 2006

(54) SYSTEM AND METHOD FOR TIME DIVISION MULTIPLEXING OF ASYNCHRONOUS VIDEO AND DATA SIGNALS

(75) Inventors: Keping Chen, Mississauga (CA); Semko Szybiak, Scarborough (CA)

(73) Assignee: Leitch Technology International Inc., Toronto (CA)

( * ) Notice: Subject to any disclaimer, the term of this patent is extended or adjusted under 35 U.S.C. 154(b) by 0 days.

(21) Appl. No.: 09/566,090

(22) Filed: May 9, 2000

(51) Int. Cl.
*H04N 7/18* (2006.01)
(52) U.S. Cl. .................. 375/240.25; 375/240.26
(58) Field of Classification Search ........ 348/470–536, 348/6, 7, 8, 9; 370/389–467; 375/240.26–240.29
See application file for complete search history.

(56) References Cited

U.S. PATENT DOCUMENTS

| | | | | |
|---|---|---|---|---|
| 5,523,795 A | * | 6/1996 | Ueda .......................... | 348/480 |
| 5,589,993 A | | 12/1996 | Naimpally | |
| 5,757,416 A | * | 5/1998 | Birch et al. ................. | 725/144 |
| 6,024,164 A | * | 2/2000 | Sorbel ......................... | 165/41 |
| 6,219,357 B1 | * | 4/2001 | Ishikawa ..................... | 370/535 |
| 6,438,145 B1 | * | 8/2002 | Movshovich et al. ....... | 370/536 |

FOREIGN PATENT DOCUMENTS

EP 0 855 820 7/1998

* cited by examiner

*Primary Examiner*—Andy Rao
(74) *Attorney, Agent, or Firm*—Dimock Stratton LLP; Mark B. Eisen

(57) ABSTRACT

A system and method for time division multiplexing multiple lower bandwidth signals into a high bandwidth signals such as a high-definition television signal. The invention provides an integrated transmission, distribution and routing signal format in which low-bandwidth signals are embedded in the active video and vertical blanking areas of a high-bandwidth signal. Data from the source data streams, including timing data, is formatted in packets, each packet comprising a plurality of channels. The packets are inserted into the high-bandwidth signal along with a header word providing a 'data valid bit' or 'status bit' for each of the channels, which identifies valid data words within the packet. The source data streams are accurately reconstituted by de-multiplexing according to header data specifying routing destination, stream ID, stream type, channel usage and stream clock reference for clock recovery at the receiving end.

20 Claims, 15 Drawing Sheets

| Words | Channel status |
|---|---|
| 0 | Segment Header |
| 1 | Channel 0 Data |
| 2 | Channel 1 Data |
| 3 | Channel 2 Data |
| 4 | Channel 3 Data |
| 5 | Channel 4 Data |
| 6 | Channel 5 Data |
| 7 | Channel 6 Data |
| 8 | Channel 7 Data |
| 9 | Channel 8 Data |
| 10 | Channel 9 Data |
| 11 | Channel 10 Data |
| 12 | Channel 11 Data |
| 13 | Channel 12 Data |
| 14 | Channel 13 Data |
| 15 | Channel 14 Data |
| 16 | Channel 15 Data |
| 17 | Channel 16 Data |
| 18 | Channel 17 Data |

Payload segment

| Words | Channel status |
|---|---|
| 0 | Segment Header |
| 1 | Channel 0 Data |
| 2 | Channel 1 Data |
| 3 | Channel 2 Data |
| 4 | Channel 3 Data |
| 5 | Channel 4 Data |
| 6 | Channel 5 Data |
| 7 | Channel 6 Data |
| 8 | Channel 7 Data |
| 9 | Channel 8 Data |
| 10 | Channel 9 Data |
| 11 | Channel 10 Data |
| 12 | Channel 11 Data |
| 13 | Channel 12 Data |
| 14 | Channel 13 Data |
| 15 | Channel 14 Data |
| 16 | Channel 15 Data |
| 17 | Channel 16 Data |
| 18 | Channel 17 Data |

Fig. 1 Payload segment

| Bit | Channel status |
|---|---|
| 19 | Not bit 18 |
| 18 | Ch. 17 word valid |
| 17 | Ch. 16 word valid |
| 16 | Ch. 15 word valid |
| 15 | Ch. 14 word valid |
| 14 | Ch. 13 word valid |
| 13 | Ch. 12 word valid |
| 12 | Ch. 11 word valid |
| 11 | Ch. 10 word valid |
| 10 | Ch. 9 word valid |
| 9 | Not bit 8 |
| 8 | Ch. 8 word valid |
| 7 | Ch. 7 word valid |
| 6 | Ch. 6 word valid |
| 5 | Ch. 5 word valid |
| 4 | Ch. 4 word valid |
| 3 | Ch. 3 word valid |
| 2 | Ch. 2 word valid |
| 1 | Ch. 1 word valid |
| 0 | Ch. 0 word valid |

Fig. 2 Segment Header

| Bit No. | Bit Field |
|---|---|
| 19 | Complement of bit 18 |
| 18 | Even parity of bits 10 to 17 |
| 10 ... 17 | Second byte: data bits 0 to 7 |
| 9 | Complement of bit 8 |
| 8 | Even parity of bits 0 to 7 |
| 0 ... 7 | First byte: data bits 0 to 7 |

Fig. 3: Generic 8-bit Data Format

| Word | Name | Data (Y) | Descriptions |
|---|---|---|---|
| 0 | ADF | $000_h$ | Ancillary data flag |
| 1 | | $3FF_h$ | |
| 2 | | $3FF_h$ | |
| 3 | DID | $143_h$ | Data ID |
| 4 | SDID | $113_h$ | Secondary DID |
| 5 | DC | $11D_h$ | Data count |
| 6-32 | HCD | Data | Header Control Data |
| 33 | RD0 | $040_h$ | Reserved data 1 |
| 34 | RD1 | $040_h$ | Reserved data 2 |
| 35 | CS | Cs | Check sum |

Fig. 4: Stream Header Format

| Word | Data | Descriptions |
|---|---|---|
| 6 | SID | Stream ID |
| 7 | STP | Stream type |
| 8-9 | CUS | Channel usage |
| 10-13 | SCR | Stream clock reference |
| 14 | AAI | Format of the addresses |
| 15-22 | DA | Destination address |
| 23-30 | SA | Source address |
| 31-32 | CRC | Header data CRC |

Fig. 5: Stream Header Format

| Bit | Data | Descriptions |
|---|---|---|
| 9 | Not P1 | Complementary P1 |
| 8 | P1 | Even parity B7-B0 |
| 7-0 | SID | Stream ID |

Fig. 6: Bit Assignment for Stream ID

| Bit | Data | Descriptions |
|---|---|---|
| 9 | Not P1 | Complementary P1 |
| 8 | P1 | Even parity B7-B0 |
| 7-0 | STP | Stream DATA type |

Fig. 7: Bit Assignment for Stream Type

| STP | Description | Bit rate | Max #ch |
|---|---|---|---|
| 01h | 1080i/60I | 1.485G | 1 |
| 02h | 720p/60p | 1.485G | 1 |
| 20h | 480p/60p | 540M | 2 |
| 21h | 480p/60p/4:2:0 | 360M | 3 |
| 22h | 480p/60I | 270M | 4 |
| 30h | 525 composite | 143M | 8 |
| 31h | 626 composite | 177M | 6 |
| 70h | Data | Up to 68M | 18 |

Fig. 8: Stream Types

Word 8

| Bit No. | Bit Field |
|---|---|
| 9 | Complement of bit 18 |
| 8 | Channel 17 is used if active 1 |
| 7 | Channel 16 is used if active 1 |
| 6 | Channel 15 is used if active 1 |
| 5 | Channel 14 is used if active 1 |
| 4 | Channel 13 is used if active 1 |
| 3 | Channel 12 is used if active 1 |
| 2 | Channel 11 is used if active 1 |
| 1 | Channel 10 is used if active 1 |
| 0 | Channel 9 is used if active 1 |

Word 9

| Bit No. | Bit Field |
|---|---|
| 9 | Complement of bit 8 |
| 8 | Channel 8 is used if active 1 |
| 7 | Channel 7 is used if active 1 |
| 6 | Channel 6 is used if active 1 |
| 5 | Channel 5 is used if active 1 |
| 4 | Channel 4 is used if active 1 |
| 3 | Channel 3 is used if active 1 |
| 2 | Channel 2 is used if active 1 |
| 1 | Channel 1 is used if active 1 |
| 0 | Channel 0 is used if active 1 |

Fig. 9: Channel Usage

| Word | Bit No. | Bit Field |
|---|---|---|
| 10 | 9 | Complement of P3 |
|  | 8 | P3, even parity of SCR(31:24) |
|  | 7-0 | SCR(31:24) |
| 11 | 9 | Complement of P2 |
|  | 8 | P2, even parity of SCR(23:16) |
|  | 7-0 | SCR(23:16) |
| 12 | 9 | Complement of P1 |
|  | 8 | P1, even parity of SCR(15:8) |
|  | 7-0 | SCR(15:8) |
| 13 | 9 | Complement of P1 |
|  | 8 | P0, even parity of SCR(7:0) |
|  | 7-0 | SCR(7:0) |

Fig. 10: Stream Clock Reference Data Format

| Word | Bit No. | Bit Field |
|---|---|---|
| 15/23 | 9 | Complement of P1 |
| | 8 | P1, even parity of ADDRESS(15:8) |
| | 7-0 | ADDRESS(15:8) |
| 16/24 | 9 | Complement of P0 |
| | 8 | P0, even parity of ADDRESS(7:0) |
| | 7-0 | Address(7:0) |
| 17/25 | 9 | Complement of P3 |
| | 8 | P3, even parity of ADDRESS(31:24) |
| | 7-0 | ADDRESS(31:24) |
| 18/26 | 9 | Complement of P2 |
| | 8 | P2, even parity of ADDRESS(23:16) |
| | 7-0 | ADDRESS(23:16) |
| 19/27 | 9 | Complement of P5 |
| | 8 | P5, even parity of ADDRESS(47:40) |
| | 7-0 | ADDRESS(47:40) |
| 20/28 | 9 | Complement of P4 |
| | 8 | P4, even parity of ADDRESS(39:32) |
| | 7-0 | ADDRESS(39:32) |
| 21/29 | 9 | Complement of P7 |
| | 8 | P7, even parity of ADDRESS(63:56) |
| | 7-0 | ADDRESS(63:56) |
| 22/30 | 9 | Complement of P6 |
| | 8 | P6, even parity of ADDRESS(55:48) |
| | 7-0 | ADDRESS(55:48) |

Fig. 11: Destination and Source Address Data Format

| Word | Bit No. | Bit Field |
|---|---|---|
| 31 | 9 | Complement of CRC(17) |
|  | 8-0 | CRC(17:9) |
| 32 | 9 | Complement of CRC(8) |
|  | 8-0 | CRC(8:0) |

Fig. 12: Header CRC bit locations

| HD Formats | Segmentsa | Channel BW (Mbit/S) | Total BW (Mbit/S) |
|---|---|---|---|
| S 1080i/60 or 59.94 | 101 | 68.0 | 1224 |
| M 1080i/50 | 101 | 56.8 | 1022 |
| 1080P/30 or 29.97 | 101 | 68.0 | 1124 |
| 1080P/25 | 101 | 56.8 | 1022 |
| 1080P/24 or 23.98 | 101 | 54.4 | 979 |
| 1080SF/30 or 23.98 | 101 | 54.4 | 979 |
| S 720P/60 or 59.94 | 67 | 60.3 | 1085 |
| M 720P/50 | 67 | 50.2 | 903 |
| 720P/30 or 29.97 | 67 | 30.1 | 541 |
| 720P/25 | 67 | 25.1 | 451 |
| 720P/24 or 23.98 | 67 | 24.0 | 432 |

Fig. 13: TDB channel bandwidth

| Configurations | A | B | C | D | E | F | G | H | I |
|---|---|---|---|---|---|---|---|---|---|
| 720Mb/s | 1 | | | | | | | | |
| 540Mb/s 480p | | 2 | | | | | | | |
| 360Mb/s 480p420 | | | 3 | | | | | | |
| 270Mb/S 4:2:2 | | | | 4 | | | | | |
| 180Mb/s 4:0:0 16x9 | | | | | 6 | | | | |
| 177Mb/s PAL | | | | | | 6 | | | |
| 143Mb/s NTSC | | | | | | | 8 | | |
| 135Mb/s 4:0:0 | | | | | | | | 9 | |
| <68Mb Data | | 2 | | 2 | | | 2 | | 18 |

Fig. 14A: Number of embedded channels

| Configurations | A | B | C | D | E | F | G | H | I |
|---|---|---|---|---|---|---|---|---|---|
| 720Mb/s | 1 | | | | | | | | |
| 540Mb/s 480p | | 2 | | | | | | | |
| 360Mb/s 480p420 | | | 3 | | | | | | |
| 270Mb/S 4:2:2 | | | | 3 | | | | | |
| 180Mb/s 4:0:0 16x9 | | | | | 6 | | | | |
| 177Mb/s PAL | | | | | | 6 | | | |
| 143Mb/s NTSC | | | | | | | 8 | | |
| 135Mb/s 4:0:0 | | | | | | | | 9 | |
| <68Mb Data | | | | 2 | | | 2 | | 18 |

Fig. 14B: Number of embedded channels

| Bit | Segment header |
|---|---|
| 19 | Legal Data.: Y&C or other HANC or VANC data.data status is valid for this channel. |
| | EAV,.SAV.ADF,. if 8 MSBs of top or bottom 10.bit words are all 0 or 1.then toggle bits 8.9.18.19 and set channel valid |
| | When channel is not used or corresponding stream data is not available for embedding.set channel word to 040 & 200 a |

| | | | | | | |
|---|---|---|---|---|---|---|
| 19 | Not bit 18 | | 18 | | | |
| 18 | Ch.17 word valid | | 17 | | | |
| 17 | Ch.16 word valid | | 16 | | | |
| 16 | Ch.15 word valid | | 15 | | | |
| 15 | Ch.14 word valid | | 14 | | | |
| 14 | Ch.13 word valid | | 13 | | | |
| 13 | Ch.12 word valid | | 12 | | | |
| 12 | Ch.11 word valid | | 11 | | | |
| 11 | Ch.10 word valid | | 10 | | | |
| 10 | Ch. 9 word valid | | 9 | | | |
| 9 | Not bit 8 | | 8 | | | |
| 8 | Ch. 8 word valid | | 7 | | | |
| 7 | Ch. 7 word valid | | 6 | | | |
| 6 | Ch. 6 word valid | | 5 | | | |
| 5 | Ch. 5 word valid | | 4 | | | |
| 4 | Ch. 4 word valid | | 3 | | | |
| 3 | Ch. 3 word valid | | 2 | | | |
| 2 | Ch. 2 word valid | | 1 | | | |
| 1 | Ch. 1 word valid | | 0 | | | |
| 0 | Ch. 0 word valid | | Bit | V=1 | V=0 | V=0 |

Fig.16d.

| 19 | Not bit 18 | | 18 | | | |
|---|---|---|---|---|---|---|
| 18 | Ch.17 word valid | | 17 | | | |
| 17 | Ch.16 word valid | | 16 | | | |
| 16 | Ch.15 word valid | | 15 | | | |
| 15 | Ch.14 word valid | | 14 | | | |
| 14 | Ch.13 word valid | | 13 | | | |
| 13 | Ch.12 word valid | | 12 | | | |
| 12 | Ch.11 word valid | | 11 | | | |
| 11 | Ch.10 word valid | | 10 | | | |
| 10 | Ch. 9 word valid | | 9 | | | |
| 9 | Not bit 8 | | 8 | | | |
| 8 | Ch. 8 word valid | | 7 | | | |
| 7 | Ch. 7 word valid | | 6 | | | |
| 6 | Ch. 6 word valid | | 5 | | | |
| 5 | Ch. 5 word valid | | 4 | | | |
| 4 | Ch. 4 word valid | | 3 | | | |
| 3 | Ch. 3 word valid | | 2 | | | |
| 2 | Ch. 2 word valid | | 1 | | | |
| 1 | Ch. 1 word valid | | 0 | | | |
| 0 | Ch. 0 word valid | | Bit | V=1 | V=0 | V=0 |

US 7,110,457 B1

SYSTEM AND METHOD FOR TIME DIVISION MULTIPLEXING OF ASYNCHRONOUS VIDEO AND DATA SIGNALS

FIELD OF INVENTION

This invention relates to data multiplexing. In particular, this invention relates to a system and method for time division multiplexing of asynchronous video signals and other data signals over a television interface.

BACKGROUND OF THE INVENTION

There are presently numerous different standards utilized in standard-definition and high-definition television systems used in studio production, post-production and distribution of television signals. As a result, a large number of incompatible interfaces exist for the interconnection and routing of component and composite digital video signals through a production, broadcast or post-production facility. For example, the 270 Mbit/s signal standard defined in SMPTE 125M-1992 has a different bandwidth than the 360-Mbit/s signal defined in SMPTE 267M-1995 or the 540-Mbit/s signal defined in SMPTE 293M-1996. The high definition television (HDTV) video signal format used in many television facilities has a bandwidth of 1.485 Gbit/s.

The interfaces utilized for each respective signal format are incompatible with the interfaces utilized for other signal formats. This results in redundancy in the case of facilities using more than one signal format in the distribution and routing infrastructure.

While a high-bandwidth link, such as that used for high-definition component video, contains sufficient bandwidth to carry multiple low-bandwidth component or composite video signals, the final multiplexed signal must comply with the signal format of the high-bandwidth link (i.e. high-definition component video) or it will be altered or blocked completely by equipment located in the link which expects a signal that is compliant with the standard high-bandwidth format. In addition, clock recovery information in each individual low-bandwidth signal must be restored after the signals are separated or the signals will be unusable.

SUMMARY OF THE INVENTION

The present invention provides a system and method for time-division multiplexing of multiple asynchronous low-bandwidth data streams into a high-bandwidth signal interface, such as the high-definition system interfaces defined in SMPTE 274M and SMPTE 296M-1997, in a bit-parallel source format for a bit-serial interface such as that defined in SMPTE 292M. The low-bandwidth "ancillary" data streams may for example comprise a combination of standard-definition video signals and generic 8-bit data signals.

This allows a single physical link to transmit, route and switch a complete family of existing 8-bit and 10-bit signal formats and various generic data formats. Existing equipment for serializing and de-serializing high-definition bit-parallel data signals for distribution throughout a facility can be used to serialize and de-serialize the high-bandwidth multiplexed data signal without any additional hardware other than equipment for multiplexing and de-multiplexing between bit-parallel high- and low-bandwidth formats.

The invention accomplishes this by providing an integrated transmission, distribution and routing signal format in which low-bandwidth signals are embedded in the active video and vertical blanking areas of a high-bandwidth signal. The "payload area" of the high-bandwidth signal (the area of the high-bandwidth signal useable for carrying information) is divided into segments. Each segment is then further divided into one or more channels. Data from a low-bandwidth source signal is inserted into one or more of the channels in the high-bandwidth signal in each segment, along with a header word providing a 'data valid bit' or 'status bit' for each of the channels, which identifies valid data words within the packet. The source data streams are accurately reconstituted by de-multiplexing according to header data specifying routing destination, stream ID, stream type, channel usage and stream clock reclock reference for clock recovery at the receiving end.

In the preferred embodiment parity bits are provided for error detection and to validate the packet header. A CRC word for header data and a checksum sum for stream header packet are included for data integrity confirmation. Further, in the preferred embodiment timing references and ancillary data headers in the source data streams are remapped when inserted into the packet data fields so as to be distinguishable from timing references in the high-bandwidth serial digital interface.

The system and method of the invention may be utilized in conjunction with any high data rate signal transmission. However, it will be appreciated by those skilled in the art that the invention is particularly suitable for multiplexing low-bandwidth video and generic data (including audio) streams with a high-definition video signal in a television facility. The present invention thus provides a method of multiplexing a higher bandwidth data stream and a plurality of lower bandwidth data streams, each of the lower bandwidth data streams having a bandwidth lower than a bandwidth of the higher bandwidth data stream, to generate a multiplexed data stream, comprising the steps of: (a) defining a data segment comprising a segment header and a plurality of data segment words, a position of each of the data segment words in a data segment representing one of a plurality of data channels, such that each of the channel words for a data channel is located in the same position within each data segment; (b) embedding the data segments into the higher bandwidth data stream; (c) embedding stream header data for each lower bandwidth data stream into the higher bandwidth data stream, the stream header data identifying which channel or channels carry the lower bandwidth data stream associated with the stream header; and (d) embedding clock reference data in each stream header as a timing reference for reconstitution of the lower bandwidth data streams at a receiver.

The present invention further provides a method of time division multiplexing a high-definition television signal and a plurality of lower bandwidth data streams comprising standard-definition television signals and generic data signals, each of the lower bandwidth data streams having a bandwidth lower than a bandwidth of the high-definition television signal, for transmission as a single multiplexed data stream via a high-definition television interface, comprising the steps of: (a) defining a data segment within the high-definition television signal, comprising a segment header and a plurality of data segment words, a position of each of the data segment words in a data segment representing one of a plurality of data channels such that each of the channel words for a data channel is located in the same position within each data segment; (b) embedding the data segments into the high-definition television signal; (c) embedding stream header data for each lower bandwidth data stream into the high-definition television signal, the stream header data identifying which channel or channels carry the lower bandwidth data stream associated with the stream header; and (d) embedding clock reference data in each stream header as a timing reference for reconstitution of the lower bandwidth data streams at a receiver.

BRIEF DESCRIPTION OF THE DRAWINGS

In drawings which illustrate by way of example only a preferred embodiment of the invention, FIG. 1 is a table showing an example of a payload segment according to the invention, FIG. 2 is a table showing a sample segment header for the payload segment of FIG. 1, FIG. 3 is a table showing a preferred data stream format, FIG. 4 is a table showing a sample data stream header for ancillary data packets, FIG. 5 is a table showing header control data, FIG. 6 is a table showing a sample stream identifier, FIG. 7 is a table showing a sample bit assignment for a data stream, FIG. 8 is a table showing a sample stream type assignment, FIG. 9 is a table showing a sample channel usage indicator, FIG. 10 is a table showing a preferred stream clock reference data format, FIG. 11 is a table showing a sample destination and source address data format, FIG. 12 is a table showing preferred header CRC bit locations, FIG. 13 is a table showing examples of channel bandwidths for time division multiplexing in different high-definition formats, FIGS. 14A and 14B are tables showing examples of possible configurations of video and data streams carried on a 1080i/60 or 59.94 HD SDI stream and on a 720p/60 or 59.94 HD SDI data stream, respectively.

DETAILED DESCRIPTION OF THE INVENTION

Figure 15A:
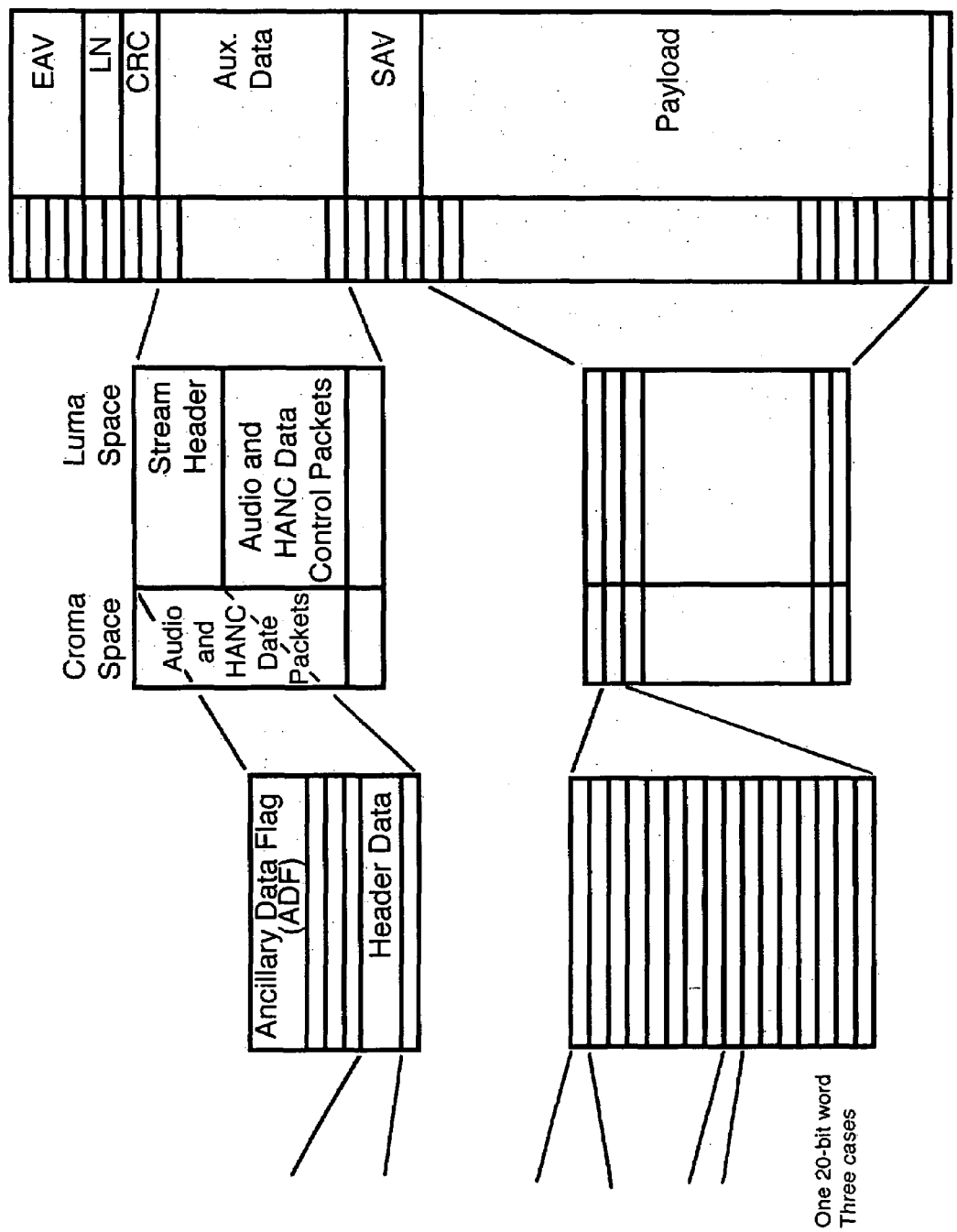
FIG. 15 is a schematic illustration of time division multiplexing mapping for one horizontal line of a 1080i/59.94 HD signal according to the invention.

A preferred embodiment of the invention will be described in relation to existing television standards for both standard-definition (SD) and high-definition (HD) television signal formats. It will be appreciated by those skilled in the art that the system and method of the invention can be implemented in non-standard formats for specific applications.

In particular, the invention will be described in reference to the following standards:

ANSI/SMPTE 259M-1997, Television—10 bit 4:2:2 component and 4Fsc composite digital signals—Serial digital interface ITU-R BT601-4 Studio encoding parameters of digital television for standard 4:3 and wide screen 16:9 aspect ratios.

ITU-R BT656-2 Interfaces for digital component video signals in 525-line and 625-line television systems operation at 422 level of ITU-R BT601

ANSI/SMPTE 125M-1992, Television—Component Video Signal 4:2:2—Bit-Parallel Digital Interface ANSI/SMPTE 267M-1995, Television—Bit-Parallel Digital Interface—Component Video Signal 4:2:2 16×9 Aspect Ratio ANSI/SMPTE 293M-1996, Television—720×483 Active Line at 59.94 Hz Progressive Scan Production—Digital Representation ANSI/SMPTE 294M-1997, Television—720×483 Active Line at 59.94 Hz Progressive Scan Production—Bit-Serial Interfaces ANSI/SMPTE 274M-1995, Television—1920×1080 Scanning and Analog and Parallel Digital Interfaces for Multiple Picture Rates ANSI/SMPTE 296M-1997, Television—1280×720 Scanning, Analog and Digital Representation and Analog Interface ANSI/SMPTE 292M-1998, Television—Bit-Serial Digital Interface for High Definition Television Systems ANSI/SMPTE 299M-1997, Television—24-Bit Digital Audio Format for HDTV Bit-Serial Interface SMPTE RP174-1993, Television—Bit-parallel Interface for 4:4:4:4 component video signal.

ISO/IEC 13818-1,—MPEG, system specifications

Some standard definition (SD) video formats suitable for the system and method of the invention are defined as follows:

Interlaced scan, 13.5 Mhz and 18 Mhz sampling frequency member of the families with 4:2:2 or 4:4:4, 4:4:4:4 sampling structures for both 525-line 60/59.94 field system and 625-line 50 field systems defined in ITU-R BT601-4, ITU-R 656-2 and ANSI/SMPTE 259M-1997;

Progressive scan, 525-line 60/59.94 frame system and 625-line 50 frame systems with 4:2:0 or 4:2:2 sampling structure defined in ANSI/SMPTE 293M and ANSI/SMPTE 294M;

4Fsc composite, 525-line and 626-line systems with the serial interface defined in ANSI/SMPTE 259M.

The bandwidths of these 10-bit SD video formats are as follows:

720 Mb/s: 525×59.94/625×50 16×9 wide-screen systems sampling at 18 Mhz with 4:4:4:4i, 8:4:4i or 4:2:2P sampling structures;

540 Mb/s: 525×59.94/625×50 16×9 wide-screen systems sampling at 18 Mhz with 4:2:2:4i, 4:4:4i or 4:2:0P sampling structure, or 525×59.94/625×50 4×3 systems sampling at 13.5 Mhz with 4:4:4:4i, 8:4:4i or 4:2:2P sampling structures;

360 Mb/s: 525×59.94/625×50 16×9 wide-screen systems sampling at 18 Mhz with 4:2:21 sampling structure, or 525×59.94/625×50 4×3 systems sampling at 13.5 Mhz with 4:2:2:4i, 4:4:4i or 4:2:0P sampling structures;

270 Mb/s: 525×59.94/625×50 4×3 interlaced scan systems sampling at 13.5 Mhz with 4:2:2 sampling structures;

180 Mb/s: 525×59.94/625×50 16×9 wide-screen systems sampling at 18 Mhz with 4:0:0i sampling structure, for black and white pictures or a keying channel in a production mixer;

177 Mb/s: 625×50 4×3 interlaced scan composite system sampling at 4Fsc;

143 Mb/s: 525×59.94 4×3 interlaced scan composite system sampling at 4Fsc;

135 Mb/s: 525×59.94/625×50 4×3 systems sampling at 13.5 Mhz with 4:0:0i sampling structure, for black and white pictures or a keying channel in a production mixer.

These standard definition signal formats are summarized in Table 1.

TABLE 1

| SD system/ Sampling Structure | 525 × 60 or 626 × 50 4 × 3 13.5 Mhz | 525 × 59.94 or 626 × 50 16 × 9 18 Mhz |
|---|---|---|
| 4:0:0I | 135 Mb/s | 180 Mb/s |
| 4:2:2I | 270 Mb/s SMPTE 267 M | 360 Mb/s SMPTE 267 M |
| 4:2:2:4I | 360 Mb/s | 540 Mb/s |
| 4:4:4I | 360 Mb/s ITU-R BT601-4 | 540 Mb/s ITU-R BT601-4 |
| 4:2:0P | 360 Mb/s | 540 Mb/s |
| 4:4:4:4I | 540 Mb/s SMPTE RP174 | 720 Mb/s |
| 8:4:4I | 540 Mb/s | 720 Mb/s |
| 4:2:2P | 540 Mb/s SMPTE 293 M | 720 Mb/s |

As used in this description the following terms have the meaning indicated:

SDI: Serial digital interface

SD: Standard-definition video.

HD: High-definition video.

1080i: 1920×1080 interlaced scan systems defined in ANSI/SMPTE 274M.

720p: 1280×720 progressive scan systems defined in ANSI/SMPTE 296M.

TDM: Time division multiplexing, in which a plurality of signals are combined for transmission on a single communications line. Each signal is broken up into many segments, each having very short duration.

Bandwidth: Data rate (equal to the clock frequency multiplied by the bit-parallel word width). Usually specified in bits/second.

Payload area: Active video area and the vertical blanking area of a high-definition video stream form the payload area of the HD signal.

Data segment: Each horizontal line of payload area for a HD signal is time divided into data segments. In the preferred embodiment each data segment consists of 19 words and contains one 20-bit segment header and eighteen 20-bit data words for the 18 data channels.

Data channel: In the preferred embodiment each data segment comprises one 20-bit segment header and eighteen 20-bit data words, each data word belonging to one of eighteen data channels. A data channel thus consists of all data words in the same position in all segments. Multiple data channels can be combined to carry any uncompressed standard definition 10-bit video stream. For an example, in a 1080i format signal a single data channel has a bandwidth of over 68 Mbit/s; four such data channels are combined to create a 270 Mbit/s video stream.

Segment header: A single 20-bit data word serving as a header for the eighteen 20-bit data words associated with the 18 data channels. The segment header preferably contains one bit "data valid" information for every data word in the segment.

Stream: A 10-bit parallel SD video signal or generic 8-bit data signal carried in one or multiple channels.

Stream header: A formatted multiple-word data structure preferably located in the luminance portion of the horizontal ancillary data space of high-definition data. The stream header contains information identifying the channels used for the associated stream. A stream header preferably also includes additional information such as the stream type and the stream clock reference.

Stream Clock Reference (SCR): A time stamp embedded in the stream header from which the de-multiplexer can recover the original clock. The Stream Clock Reference operates on the same principle as the program clock reference (PCR) in MPEG standard ISO/IEC 13818-1.

EAV and SAV: These are timing reference signals occurring in every line, preferably as described in ANSI/SMPTE 274M and ANSI/SMPTE 296M.

Ancillary Data Flag (ADF): The ancillary data flag is one word in composite systems as described in ANSI/SMPTE 244M and three words in component systems as described in ANSI/SMPTE 125M and ANSI/SMPTE 291M.

The invention provides an integrated transmission, distribution and routing format to simplify studio systems and reduce interface costs of digital production facilities handling various video formats. The preferred embodiment uses a single serial digital interface (SDI) to carry all HD SDI signals specified in ANSI/SMPTE 292M plus all SD video signals, compressed video and other data. The system and method of the invention assembles these multiple 10-bit standard definition video streams and 8-bit data streams into a single 20-bit high definition video stream which in the preferred embodiment is scrambled and serialized in accordance with ANSI/SMPTE 292M.

The Payload Area

In the preferred embodiment the word clock rate is established at 74.25 MHz or 74.25/1.001 MHz in accordance with ANSI/SMPTE 274M. The HD data word length is 20 bits with the top 10 MSB bits as a chrominance component and the bottom 10 bits as a luminance component. All SD video and data signals are time division multiplexed into the space between SAV and EAV of each line in the HD signal, including HD vertical blanking lines, defined herein as the "payload area". Every word of an uncompressed stream of 10-bit video is multiplexed into payload area, including active video words, EAV, SAV, and all vertical and horizontal ancillary data. EAV, SAV and ADF contain $3FF_h$ and $000_h$ which cannot be embedded directly to HD payload area; special coding is provided to map these components into the payload area.

Stream Header Packets

In the preferred embodiment a stream header packet for every SD video and data stream is placed after EAV/LN/CRC in the luminance component of the HD stream. For each SD stream, only one stream header is sent per HD frame. The stream header may be placed on any line after the 17th line following the switching point. The switching point for a 1080i system is at line 7 as specified in ANSI/SMPTE 299M.

HD SDI signals as defined in SMPTE 292M are treated as a special case where original source formats are used. In this situation the payload area is not divided into multiple segments or channels. A stream header is optional for HD SDI, however, it is recommended to use for easier stream identification and routing information.

Payload Data Format

The payload data format is the multiplexing scheme used to pack a number of asynchronous 10-bit SD video component and composite video streams and 8-bit generic data streams into the payload area of the high-definition signal. In the preferred embodiment the payload area is defined as the active video area plus the vertical blanking area of the HD signal. The bit-serial digital interface for high-definition systems defined in SMPTE 292M specifies a source format (bit-parallel input) for the bit-serialization of two parallel data components (chrominance and luminance, respectively), producing a combined word width of 20 bits. Hence the payload word width in the preferred embodiment is 20 bits.

The active video and vertical blanking area of a horizontal line in the HD signal is further segmented into a 19 word structure. When a length of active video line is indivisible by 19, all words in any remaining segment of the line are set to $200_h$ and $040_h$.

The payload area is formatted into segments. Each payload segment is a 19-word structure that contains all multiplexed data from the source data streams. The first 20-bit word is the payload segment header and the remaining 18 words each contain one 20-bit word corresponding to each of the 18 channels, as shown in FIG. 1. The segment header provides one extra bit for each of the eighteen channels of data in the payload segment, which is a "data valid" bit. Alternatively, the data valid bit can be considered the twenty-first data bit of each data word.

The payload segment header identifies valid data words within the payload segment. The format for the segment header is shown in FIG. 2. Bits 0 to 8 and bits 10 to 18 indicate the data validation of the following eighteen data channels. Bit 9 is the complement of bit 8 and bit 19 is the complement of bit 18. This ensures that the 10-bit word in the active video area can only be in the range of $004_h$ to $3FB_h$.

10-Bit Video Stream Data Format

For standard definition video signals including 480p (540 Mbit/s) or 480i at 270 Mbit/s, each 10-bit parallel data word is mapped to 20-bit words. Luminance is mapped to luminance space and chrominance is mapped to chrominance space.

The timing references (EAV and SAV) and ancillary data headers in the input (source) SD video stream are remapped when inserted into the payload segment data fields, so that they are not confused with the timing references in the HD SDI. Both higher 10-bit and lower 10-bit data are within the code range of $004_h$ to $3FB_h$. The word values that need to be remapped are $000_h$, $001_h$, $002_h$, $003_h$, $3FC_h$, $3FD_h$, $3FE_h$, and $3FF_h$.

Multiplexed 20-bit words, derived from SD SDI 10-bit words, fall into one of three possible cases:

1) Both the upper and lower 10 bits do not violate the code range. Such a word is multiplexed "as is" and the corresponding data valid bit for this channel in the segment header will be set to logic 1.

2) The total bandwidth of channels assigned to the input video or data stream is always higher than the bit rate of the input video or data stream. Therefore, at the multiplexer the input FIFO could be empty from time to time. When FIFO is empty, the data to be embedded is not available so the channel valid bit is set to 0 and the data word is forced to $200_h$ and $040_h$ at the multiplexer.

3) The input words contain the EAV, SAV, or ADF in HANC and VANC space in a video stream to be embedded. In this case the input words may be confused with the HD timing reference signal and violate the coding range in the HD data format. To avoid this occurrence in the multiplexer, bits 12 through 19 and bits 2 through 9 are examined. If one of them is $00_h$ or $FF_h$, the corresponding header valid bit is set to 0 and bits 19, 18, 9 and 8 are toggled. At the de-multiplexer end, if the header valid bit is read as 0 and the corresponding data word is not $200_h$ and $040_h$, the de-multiplexer will interpret the word as part of original EAV, SAV or ADF. Bits 19, 18, 9 and 8 are then be toggled back to their original logic. The unused channels will have the default value of $200_h$ and $040_h$. The corresponding valid bit is set to logic 0.

Generic Data Stream Format

In addition to uncompressed video source data streams, compressed video data and generic 8-bit source data streams are supported by the system and method of the invention. For purposes of error detection and to prevent the possibility of inserting values that might be confused with timing references in the high-definition interface, each 8-bit word in the input data stream is appended with a 2-bit parity field in the most significant position. Bit 8 is the even parity of the eight data bits and bit 9 is its complement, as shown in FIG. 3.

Stream Header Format

In the preferred embodiment stream headers are embedded in the luminance component of the horizontal ancillary data space in HD SDI. They are used to identify specific video or data embedded in payload area. Stream header contains the configuration information about streams, the channels in the payload area, and the payload segments that are organized into channels. Each stream header conforms to ANSI/SMPTE 291M ancillary data packet type 2, as shown in FIG. 4.

Horizontally, a stream header is left justified after the EAV/LN/CRC or any preexisting ancillary data packet. Vertically, the stream header is inserted within the 18 lines following the switching point. There is at least one stream header per HD frame for every stream. The rest of the ancillary data space is left free to carry any other ancillary data.

Ancillary Data Format

As previously described, in the preferred embodiment the stream header is an ancillary data packet of type 2. In addition, the ancillary data format (ADF), data ID (DID), secondary data ID (SDID), data count (DC) and checksum (CS) all conform to ANSI/SMPTE 291M.

The data ID of the ancillary data packet is set to $XX_h$. The secondary data ID is used to represent the number of channels in the HD payload area. For example, 101*h* represents a single channel and 113*h* represent 19 channels.

The data count represents 27 words of header control data and two words of user reserved data for bit 7 through bit 0. Bit 8 is the even parity for bit 7 through bit 0 and bit 9 is the complement of bit 8. The resulting value is $11D_h$.

Checksum is calculated from the upper and lower 10-bit data independently. Each checksum word consists of nine bits (most significant bits of the 10-bit words are not used in the checksum calculation). The checksum word is used to determine the validity of the words ID through user data. Bit 19 is the complement of bit 18, and bit 9 is the complement of bit 8.

Header Control Data

The stream header control data (HDC) contains information regarding the stream ID, stream type and channel usage which specifies how many and which channels belong to the data stream. The stream header also contains a stream clock reference for clock recovery at receiver side, as well as source and destination addresses for intelligent routing. A CRC word for the header data for each stream header packet is also included for the data integrity check. An example is shown in FIG. 5.

The stream ID has 256 values, as shown in FIG. 6, to distinguish the various video and data streams. The stream data type (SDT) is used to identify the stream format of the source video or data stream. FIG. 7 illustrates an example of bit assignment for stream type. FIG. 8 illustrates examples of various stream types. For uncompressed HD SDI video at 1.485 Gbit/s, it is possible to include a stream header conforming to the SMPTE 292M standard even though the payload data would not be partitioned to 19 channels.

Channel usage is made of two 10-bit control words that specify which channels belong to the respective video/data streams. Bit 9 of both words is the complement of bit 8 in order to make the word conform to SMPTE 292M. Each of the remaining 9 bits indicates whether the corresponding channel is used for this stream. An example is shown in FIG. 9.

Stream Clock Reference

The stream clock reference (SCR) operates on a principle similar to the program clock reference (PCR) used in MPEG system specifications. A 32-bit SCR is carried by four 10-bit words, as shown in FIG. 10.

At a multiplexer, each SD SDI video and data stream has a 32-bit counter incrementing at corresponding clock rate. Each time a stream header is embedded into the HD stream, the current value of the counter is also embedded into the HD stream. The de-multiplexer may reconstitute the original stream clock from the SCR and their respective arrival times. At the de-multiplexer, the SCR is compared with a 32-bit counter incremented by the local stream clock generator and a phase locked loop can be used to speed up or slow down the local clock depending on the difference of the SCR and the local counter. Since the stream header is embedded every field or frame, the SCR is updated every HD field or frame.

The SCR accuracy should be +/−1 SD sample period for an asynchronous SD stream (with respect to the HD carrier) and +/−0 sample periods for a synchronous SD stream. Since the HD stream clock is very stable, a reliable SD clock can be generated in the receiver clock recovery unit.

Authorized Address Identifier

The authorized address identifier (AAI) is intended to identify the format of the destination and source address words with 256 different states. Bits 0 to 7 of the word 14 are used as actual AAI data and bit 8 is even parity of bit 0 to 7. Bit 9 is complement to bit 8. Word $00_h$ is reserved for unspecified address and word $01_h$ is for Ipv6 address.

The destination and source addresses represent the addresses of the devices within the connection according to the AAI. Sixteen bytes are allocated for both destination addresses (words 15 to 22) and source addresses (words 23 to 30) with the structure indicated in FIG. 11. A universal address to all devices connected to the interface is indicated when all sixteen bytes are zero filled.

Header Data CRC

The header CRC covers the entire header data starting from beginning of header data and end with two reserved words. The generator polynomial for the header CRC is $$G(X)=X^{18}+X^5+X^4+1$$

which conforms to ITU-T x.25.

Header CRC is 18 bits long and occupies a single 20-bit word. Header CRC is placed as shown in FIG. 12. Bit 9 and bit 19 are the complement of CRC(8) and CRC(17), respectively, to conform to the SMPTE 292M standard.

Time Division Multiplexing Data

The bit rates in the variety of HD formats described in ANSI/SMPTE 292M, ANSI/SMPTE 274M and ANSI/SMPTE 296M are almost the same, except for a minor variation 1000/1001 in some of the formats. However, TDM data is embedded only in the active video and the vertical blank area, and the active video and the vertical blank area are all different for different HD formats. Therefore, the bandwidths for TDM channels in the different HD formats are different. FIG. 13 shows the channel bandwidth and total bandwidth for various HD formats. Since there are 18 TDM channels in the payload area, the total bandwidth is the product of 18 multiplied by the channel bandwidth.

Since the channel bandwidth for different HD formats is not the same, the number of channels required to construct a given bandwidth video/data stream may also differ. FIG. 13A shows examples of possible configurations (A through I) of video and data streams carried on a 1080i/60 or 59.94 HD SDI stream. FIG. 13B shows examples of possible configurations (A through I) of video and data streams carried on a 720p/60 or 59.94 HD SDI stream.

Figure 15B:
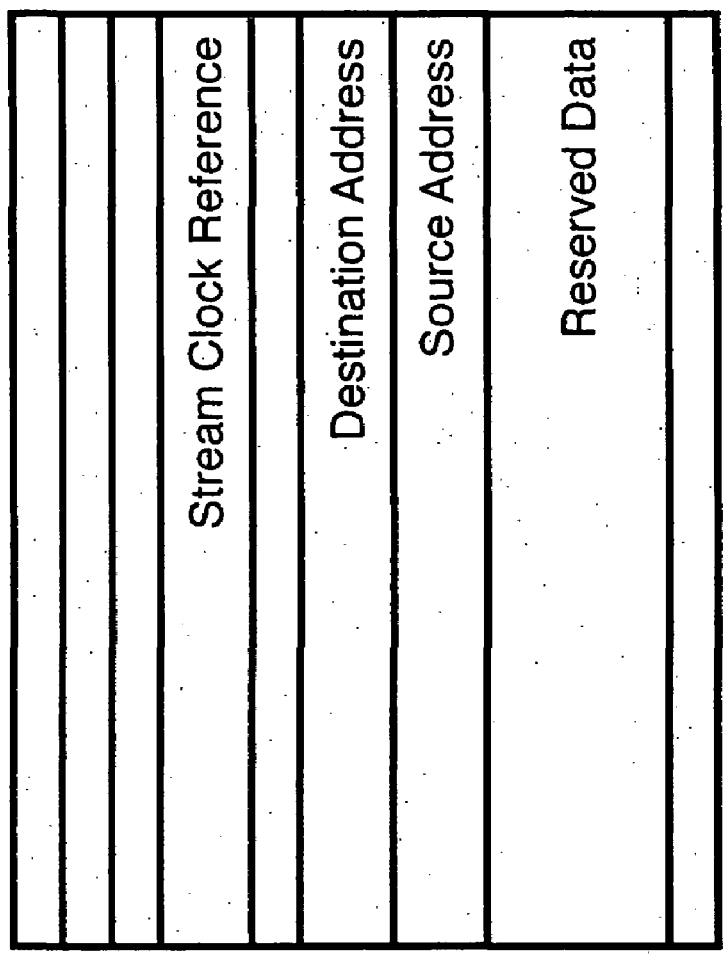
Figure 16A:
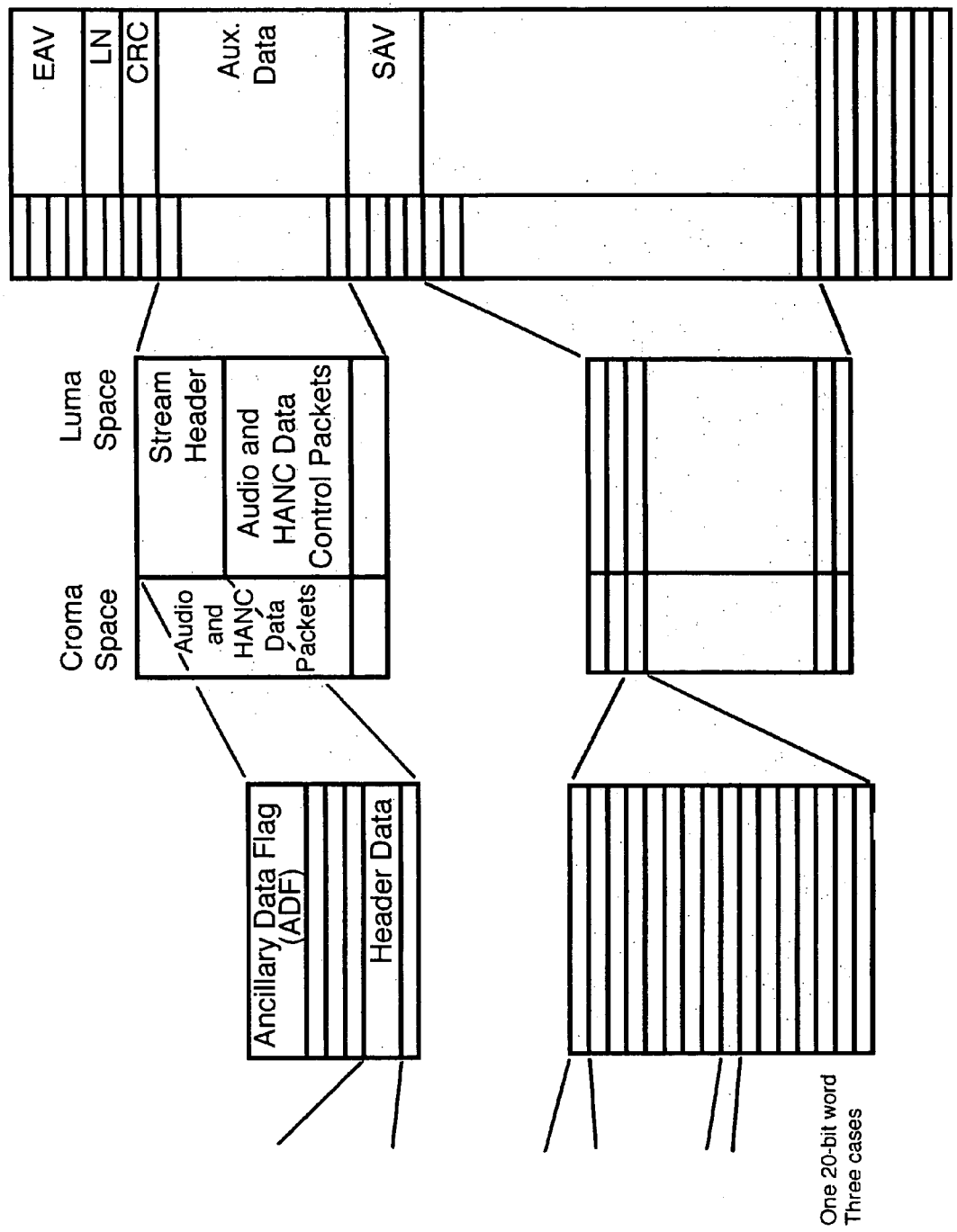
FIG. 16 is a schematic illustration of time division multiplexing mapping for one horizontal line of a 720p/59.94 HD signal according to the invention.
Figure 16B:
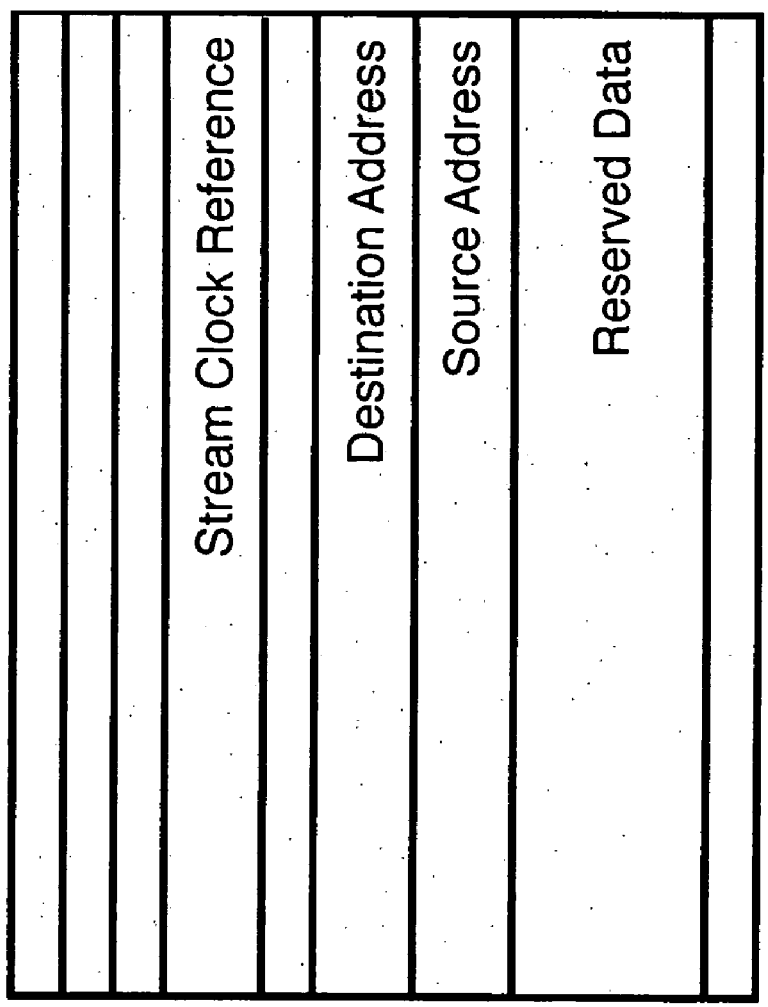
Figure 16C:
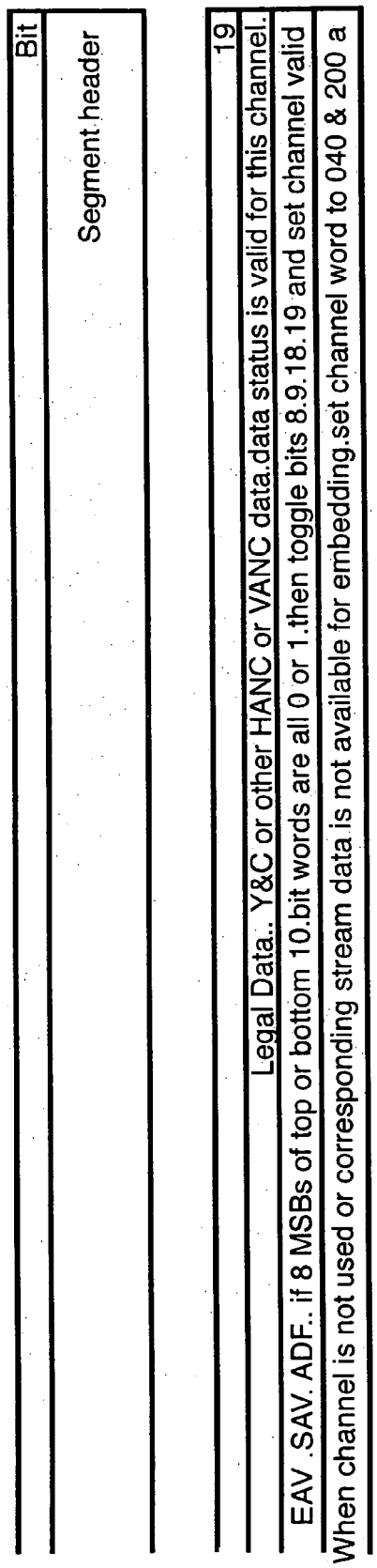

FIG. 15 is a schematic representation of time division multiplexing mapping of a horizontal line of a 1080i/59.94 HD signal according to the invention. FIG. 16 is a schematic representation of time division multiplexing mapping of a horizontal line of a 720p/59.94 HD signal according to the invention. The bit assignments within the payload area are as described above in the context of a preferred embodiment of the invention, however these can be interchanged and reordered in any suitable fashion with appropriate reconciliation of the logic in the multiplexer and de-multiplexer components of the system.

A preferred embodiment of the invention having been thus described by way of example only, it will be apparent to those skilled in the art that certain modifications and adaptations may be made without departing from the invention. The invention is intended to include all such modifications and adaptations as fall within the scope of the appended claims.

We claim:

1. A method of multiplexing a higher bandwidth data stream and a plurality of lower bandwidth data streams, each of the lower bandwidth data streams having a bandwidth lower than a bandwidth of the higher bandwidth data stream, to generate a multiplexed data stream, comprising the steps of:

(a) defining a data segment comprising a segment header and a plurality of data segment words, a position of each of the data segment words in a data segment representing one of a plurality of data channels, such that each of the channel words for a data channel is located in the same position within each data segment;

(b) embedding the data segments into the higher bandwidth data stream;

(c) embedding stream header data for each lower bandwidth data stream into the higher bandwidth data stream, the stream header data identifying which channel or channels carry the lower bandwidth data stream associated with the stream header; and (d) embedding clock reference data in each stream header as a timing reference for reconstitution of the lower bandwidth data streams at a receiver.

2. The method of claim 1 including the step of serializing the lower bandwidth data stream before the step of defining a data channel.

3. The method of claim 1 in which the data segments are embedded into an active video area or a vertical blanking area, or both, of the higher bandwidth data stream.

4. The method of claim 3 in which the data segments each comprise data identifying which of the channels in a data segment contain valid data.

5. The method of claim 1 in which the stream header data is embedded in a luminance portion of the higher bandwidth data stream.

6. The method of claim 1 including the step of defining a source address or a destination address, or both, in the stream header data.

7. The method of claim 1 in which each data segment comprises 19 data words including the segment header and one word for each of 18 channels.

8. The method of claim 7 in which each word contains 20 bits of data.

9. The method of claim 2 in which the plurality of lower bandwidth data streams comprises at least one 10-bit parallel standard-definition video signal.

10. The method of claim 1 in which the plurality of lower bandwidth data streams comprises at least one 8-bit data stream.

11. A method of time division multiplexing a high-definition television signal and a plurality of lower bandwidth data streams comprising standard-definition television signals and generic data signals, each of the lower bandwidth data streams having a bandwidth lower than a bandwidth of the high-definition television signal, for transmission as a single multiplexed data stream via a high-definition television interface, comprising the steps of:

(a) defining a data segment within the high-definition television signal, comprising a segment header and a plurality of data segment words, a position of each of the data segment words in a data segment representing one of a plurality of data channels such that each of the channel words for a data channel is located in the same position within each data segment;

(b) embedding the data segments into the high-definition television signal;

(c) embedding stream header data for each lower bandwidth data stream into the high-definition television signal, the stream header data identifying which channel or channels carry the lower bandwidth data stream associated with the stream header; and (d) embedding clock reference data in each stream header as a timing reference for reconstitution of the lower bandwidth data streams at a receiver.

12. The method of claim 11 including the step of serializing the lower bandwidth data stream before the step of defining a data channel.

13. The method of claim 11 in which the data segments are embedded into an active video area or a vertical blanking area, or both, of the high-definition television signal.

14. The method of claim 13 in which the data segments each comprise data identifying which of the channels in a data segment contain valid data.

15. The method of claim 11 in which the stream header data is embedded in a luminance portion of the high-definition television signal.

16. The method of claim 11 including the step of defining a source address or a destination address, or both, in the stream header data.

17. The method of claim 11 in which each data segment comprises 19 data words including the segment header and one word for each of 18 channels.

18. The method of claim 17 in which each word contains 20 bits of data.

19. The method of claim 12 in which the plurality of lower bandwidth data streams comprises at least one 10-bit parallel standard-definition video signal.

20. The method of claim 11 in which the plurality of lower bandwidth data streams comprises at least one 8-bit data stream.

* * * * *